(12) United States Patent
Gompper et al.

(10) Patent No.: US 6,341,582 B1
(45) Date of Patent: Jan. 29, 2002

(54) LIVESTOCK SORTING SYSTEM

(75) Inventors: Brion Gompper, Onalaska; Kevin Keeffe, La Crosse; Donald Mayer, Trempealeau, all of WI (US)

(73) Assignee: Babson Bros. Co., Naperville, IL (US)

( * ) Notice: Subject to any disclaimer, the term of this patent is extended or adjusted under 35 U.S.C. 154(b) by 0 days.

(21) Appl. No.: 09/162,434

(22) Filed: Sep. 28, 1998

(51) Int. Cl.$^7$ .................. A01K 5/02; G08B 23/00; G06F 7/04
(52) U.S. Cl. ............ 119/840; 119/518; 340/573.1; 340/825.31
(58) Field of Search .................. 119/518, 712, 119/721, 840, 841, 484, 842, 908; 340/564, 573.1, 825.31, 825.32

(56) References Cited

U.S. PATENT DOCUMENTS

| | | |
|---|---|---|
| 1,899,320 A | 2/1933 | Dupuy |
| 3,128,744 A | 4/1964 | Jefferts et al. |
| 3,844,273 A | 10/1974 | Polson |
| 3,897,753 A * | 8/1975 | Lee et al. .............. 119/51.02 |
| 3,949,709 A | 4/1976 | Myers |
| 4,000,718 A | 1/1977 | Brown |
| 4,022,263 A * | 5/1977 | Beckett et al. ............. 160/92 |
| 4,114,151 A | 9/1978 | Denne et al. |
| 4,129,855 A * | 12/1978 | Rodrian ............... 340/825.34 |
| 4,136,641 A * | 1/1979 | Hoffman |
| 4,138,968 A * | 2/1979 | Ostermann |
| 4,216,743 A * | 8/1980 | Cohen ..................... 119/484 |
| 4,274,083 A | 6/1981 | Tomoeda |
| 4,325,146 A * | 4/1982 | Lennington ............... 455/604 |
| 4,364,030 A * | 12/1982 | Rossin ................... 340/567 |
| 4,461,241 A * | 7/1984 | Ostler .................. 119/51.02 |
| 4,463,353 A | 7/1984 | Kuzara |
| 4,475,481 A * | 10/1984 | Carroll ................ 119/51.02 |
| 4,497,133 A * | 2/1985 | Blenkinsop ................ 49/31 |
| 4,798,175 A | 1/1989 | Townsend et al. |
| 5,063,880 A * | 11/1991 | Bouthillier .............. 119/667 |

(List continued on next page.)

FOREIGN PATENT DOCUMENTS

| | | |
|---|---|---|
| DE | 37 02 465 A1 | 8/1988 |
| EP | 0 331 269 A1 | 9/1989 |
| EP | 0 499 428 A1 | 8/1992 |
| EP | 0 748 586 A3 | 6/1995 |
| EP | 0 748 586 A2 | 6/1995 |
| GB | 2053343 A | 2/1981 |
| WO | WO 87/04898 | 8/1987 |

OTHER PUBLICATIONS

International Search Report (Form PCT/ISA/210—second sheet) received Jan. 19, 2000.
Letter of Nov. 22, 1999 to Dale Termunde from Paul D. Thompson, Ph.D.
Letter of May 7, 1998 from Jeffrey S. Ward to Michael S. Anderson.
Letter of May 22, 1998 from Michael S. Anderson to Jeffrey S. Ward.
Letter of Jun. 10, 1998 from Michael S. Anderson to Jeffrey S. Ward.
Letter of Jun. 11, 1998 from Jeffrey S. Ward to Michael S. Anderson.
Letter of Jul. 1, 1998 from Michael E. Taken to Jeffrey S. Ward.

(List continued on next page.)

Primary Examiner—Charles T. Jordan
Assistant Examiner—Yvonne R. Abbott
(74) Attorney, Agent, or Firm—Lathrop & Clark LLP

(57) ABSTRACT

A livestock sorting system that uses an activity-based controller for receiving sort signals, opening a sort gate in response to each of said signals, and closing the sort gate only when no sort signals are pending.

33 Claims, 3 Drawing Sheets

U.S. PATENT DOCUMENTS

| | | | |
|---|---|---|---|
| 5,183,008 A | | 2/1993 | Carrano |
| 5,501,179 A | * | 3/1996 | Cory .......................... 119/712 |
| 5,533,469 A | | 7/1996 | Touchton et al. |
| 5,595,144 A | * | 1/1997 | Loher ......................... 119/840 |
| 5,628,284 A | | 5/1997 | Sheen et al. |
| 5,711,246 A | | 1/1998 | Yano et al. |

OTHER PUBLICATIONS

Letter of Jul. 17, 1998 from Jeffrey S. Ward to Michael E. Taken.

Letter of Aug. 4, 1998 from Jeffrey S. Ward to Michael E. Taken.

Letter of Dec. 2, 1998 from Michael E. Taken to Jeffrey S. Ward.

Letter of Jan. 7, 1999 from Jeffrey S. Ward to Michael E. Taken.

Letter of Feb. 8, 1999 from Michael E. Taken to Jeffrey S. Ward.

Letter of Feb. 25, 1999 from Jeffrey S. Ward to Michael E. Taken.

Letter of Oct. 29, 1999 from Jeffrey S. Ward to Michael E. Taken.

PCT/IPEA/408, Written Opinion received Oct. 30, 2000, 6pgs.

* cited by examiner

Fig. 3
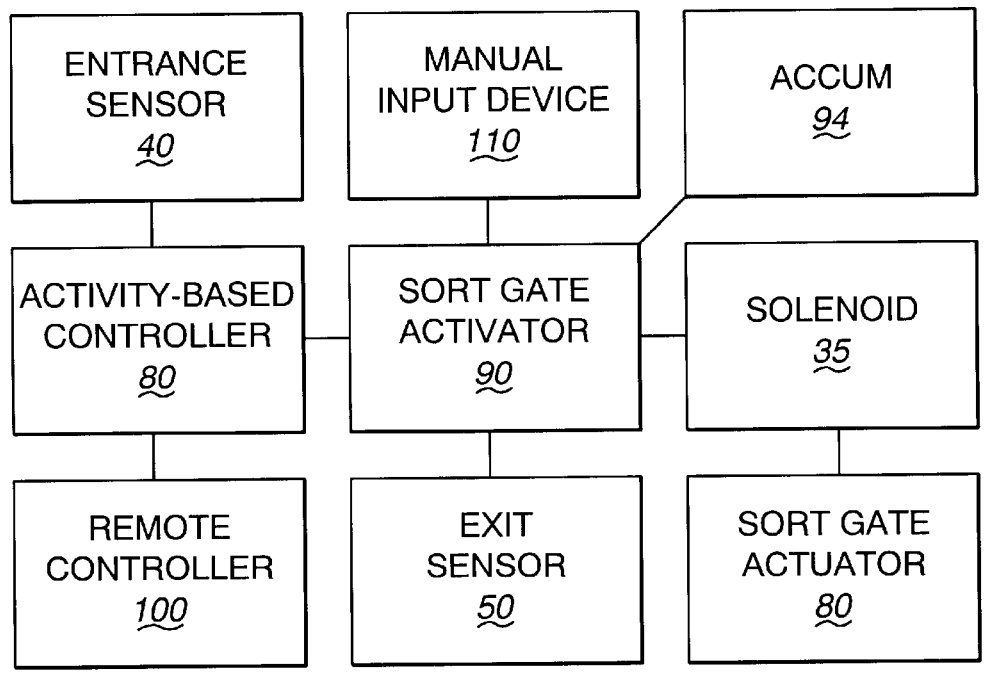
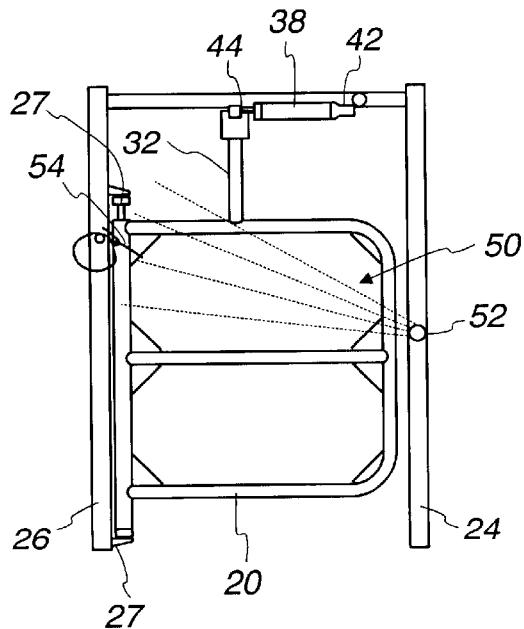
Fig. 4
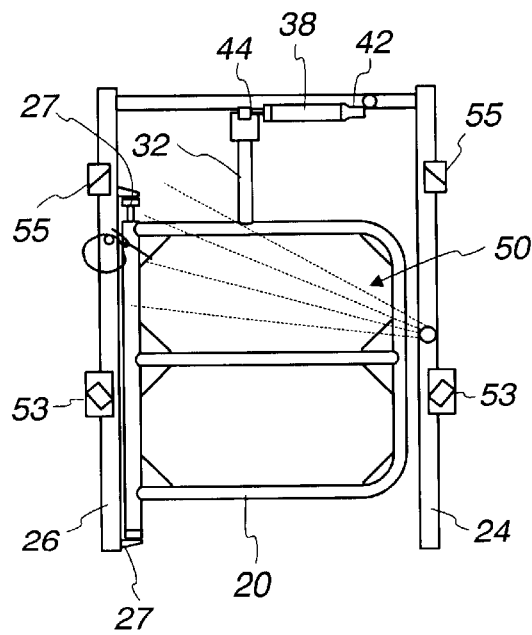
Fig. 4A

LIVESTOCK SORTING SYSTEM

FIELD OF THE INVENTION

The present invention relates generally to livestock handling systems. More particularly, the present invention relates to an automated livestock sorting system for identifying and sorting livestock.

BACKGROUND OF THE INVENTION

Livestock sorting systems are used in dairy harvesting facilities to identify and sort dairy cows so that specific, identified cows can receive special handling, such as periodic medical examination or treatment, isolation from other livestock, or combination with livestock having similar characteristics, including milk production or milk let-down curves. Typically, these livestock sorting systems are connected to a milking parlor, and the cows are sorted as they leave the parlor after milking has been completed. Conventional livestock sorting systems include an alley having an entrance, a main exit, and a sort exit. An air-driven gate is positioned in the alley for movement between a sorting position, in which the gate blocks the main exit and opens the sort exit, and a non-sorting position, where the gate blocks the sort exit and opens the main exit. Typically, as shown in U.S. Pat. No. 4,798,175 ("the '175 patent"), and U.S. Pat. No. 5,183,008 ("the '008 patent"), the livestock sorting system utilizes a pneumatic circuit for actuating the gate and includes an air-piloted spool valve for controlling the operation of the gate.

An electronic identification system such as that disclosed in the '175 and '008 patents is typically provided at or near the entrance of the alley for sensing the presence of cows in the alley and for providing an electric signal when a "sort cow" is present. Each cow wears a transponder that is detected by an antenna as the cows pass through the entrance of the alley. When a sort cow is detected by the identification system, an electric signal is provided that interfaces with the pneumatic circuit to generate a fluid signal that triggers the spool valve to move the gate into the sorting position.

Once the gate has been opened to the sorting position, it can be closed in several ways. For example, the '175 patent provides a one-way gate in the sort exit that includes a pneumatic switch that is actuated when an animal pushes the one-way gate to the open position as the animal passes through the sort exit. The '008 patent provides a pneumatic exit switch, such as a trip wand, that is mounted on the sort gate and is actuated by contact with the animal as it passes through the sort exit. Either way, the pneumatic signal from the switch is delivered to the spool valve to move the gate to the non-sorting position.

The pneumatic livestock sorting systems exemplified by the '175 and '008 patents are complex, requiring an extensive pneumatic network, and are difficult to install and maintain. Moreover, it is difficult to control and coordinate several of these pneumatic systems from a remote location. Further, it is difficult to efficiently sort livestock using a pneumatic system due to the inherent lag time required for a pneumatic control to respond to a command.

Some of these problems were addressed by livestock sorting systems having an electrical gate actuating system. U.S. Pat. No. 5,628,284 ("the '284 patent") discloses a livestock cutter gate apparatus utilizing a solenoid-driven spool valve to open and close the sort gate.

However, whether a livestock sorting system is pneumatic or electrical, the major challenge in designing a sorting system is to allow for smooth livestock flow. If the sorting system does not allow for smooth cow flow, cows can "back up" at the sorting system, creating problems in both upstream and downstream operations. Moreover, the system should be designed to avoid (1) sorting cows that should not be sorted or (2) not sorting cows that should be sorted. Obviously, errors in the sorting process defeat the rationale for having a sorting system in the first place.

Typically, errors in sorting are caused by fast moving cows following closely behind a lead cow. If sort gate is opened for the lead cow, the following cow may attempt to enter the sort exit before the gate closes, regardless of whether it is a sort cow. Likewise, if the lead cow is not a sort cow and the second cow is a sort cow, the gate may not open in time to sort the second cow.

These problems have been addressed in various ways. The cutter gate apparatus of the '284 patent provides a pair of saloon gates located at the entrance of the alley. If a cow is identified as a sort cow, the saloon gates are closed until such time that the sort cow has entered the sort exit and pushed open the exit gate, causing the sort gate to close. In this manner, the problem of sorting a "non-sort" cow is avoided. However, where the sort cow is slow-moving, the use of saloon gates can stop cow flow, with cows backing up at the saloon gates. Further, the use of saloon gates doubles the amount of mechanical controls necessary to operate the sort gate, requires timing devices to activate both gates simultaneously, and doubles the number of potential "pinch points" where the animal or operator can be injured.

The sort gate of the '008 patent utilizes an air-piloted spool valve having two pressurized air inputs as an override device. One input causes the gate to close, while the other causes the gate to open. If pressurized air is supplied to both inputs, i.e., both a gate open and a gate close signal are given, the gate remains open. Thus, if a second sort cow has been identified before a first sort cow has entered the sort exit and tripped the exit switch, when the first cow does trip the exit switch pressurized air will be provided at both ports of the spool valve, with the result that the sort gate remains open. Again, however, this is a pneumatic system and suffers from the same infirmities discussed above with respect to pneumatic systems generally. Moreover, use of an air-piloted spool valve results in a system that is overly dependent on the cleanliness of the air supply and proper lubrication for its operation, and hence is prone to reliability problems when used in a livestock environment.

Further, none of the prior art sort gates have safety features that can prevent injuries to livestock and to dairy personnel in the event a gate closes prematurely.

What is needed is a safe livestock sorting system having an electrically actuated gate that is controlled by an activity-based controller in a manner to ensure smooth cow flow and to minimize sorting errors. What is also needed is a livestock sorting system that can be operated and monitored from a location remote from the sorting system itself, and is able to interface with other dairy harvesting facility operations that may indicate or otherwise identify cows to be sorted. What is further needed is a system that is less complex and easier to maintain and operate than prior art livestock sorting systems. Finally, there is a serious need for a livestock sorting system that reduces or avoids injury to livestock and dairy personnel in the event a sort gate closes prematurely.

These needs are met by the livestock sorting system of the present invention.

SUMMARY OF THE INVENTION

The livestock sorting system of the present invention comprises (a) an alley comprising an entrance, a main exit and a sort exit, (b) a sort gate positioned in the alley between the main exit and the sort exit, the sort gate being shiftable between a sorting position in which the sort gate blocks the main exit and opens the sort exit, and a non-sorting position in which the sort gate blocks the sort exit and opens the main exit, (c) an entrance sensor, (d) an activity-based controller, (e) a sort gate activator, and (f) an exit sensor. The entrance sensor identifies individual livestock entering the alley and provides an identification signal to the activity-based controller for each animal. The activity-based controller compares the identification signal to a database comprising identification of cows to be sorted. If the identification signal corresponds to a specific animal identified as a sort cow in the database, the activity-based controller sends a sort signal to a sort gate activator.

Upon receipt of the sort signal from the activity-based controller, the sort gate activator sends a gate open signal, thereby causing the sort gate to shift to the gate open position. As the sort cow enters the sort exit, it passes the exit sensor, which provides an exit signal to the sort gate activator. When the sort gate activator receives the exit signal, it checks whether it has received a sort signal from the activity-based controller indicative of an additional animal to be sorted. If no such signal has been received, the sort gate activator provides a gate close signal, thereby causing the sort gate to shift to the non-sorting position. If, on the other hand, the sort gate activator has received an additional sort signal from the activity-based controller, no gate close signal is sent, and the sort gate remains in the sorting position.

The sort gate activator includes an accumulator function, or is connected to an accumulator device. The accumulator function or accumulator device has a predetermined gate close value that is incremented by a predetermined counting value when the sort gate activator receives a sort signal from the activity-based controller. When an exit signal is received from the exit sensor, the accumulator function or device decrements the same counting value. If decrementing the counting value results in the predetermined gate close value being obtained, the sort gate activator sends a gate close signal. Otherwise, no gate close signal is sent.

The livestock sorting system of the present invention provides for smooth livestock flow, and substantially eliminates sorting errors. Since the system of the present invention is electrical, rather than pneumatic, it is less complex, easier to install and operate, and more responsive than the prior art pneumatic systems exemplified in the '175 and '008 patents. The system of the present invention further results in improved cow flow over the livestock cutting apparatus of the '286 patent, since no saloon gates are needed to reduce sorting errors. Moreover, additional sort gate systems can easily be added for additional sort functions.

The livestock sorting system of the present invention also can adapt to individual livestock parameters, such as the speed at which an individual animal moves at specific points in time and therefore can be used to optimize livestock flow through a facility by opening and closing gates based on each individual animal's rate of speed.

Therefore, it is an object of the present invention to provide a livestock sorting system that allows for smooth animal flow and substantially eliminates sorting errors.

It is an additional object of the present invention to provide a livestock sorting system that is easy to install and operate, less complex and more responsive than currently available systems.

It is a further object of the present invention to provide a system that can be operated from a remote location.

It is yet an additional object of the present invention to provide a system that can be operated in conjunction with additional livestock sorting systems or other dairy harvesting operations for a remote location.

It is yet another object of the present invention to provide a system that can adapt to individual livestock parameters, such as rate of speed, and can customize gate opening and closing for each animal, thereby resulting in seamless animal flow.

Further objects, features, and advantages of the present invention will be apparent from the following detailed description when taken in conjunction with the accompanying drawings.

BRIEF DESCRIPTION OF THE DRAWINGS

FIG. 3 is a schematic view of one embodiment of the control circuit of the livestock sorting system of the present invention.

FIG. 4 is a top plan view of a sort gate apparatus of the present invention.

FIG. 4A is a top plan view of a sort gate apparatus of the present invention including a crossed pair of photo switches.

DESCRIPTION OF THE PREFERRED EMBODIMENTS

Figure 1:
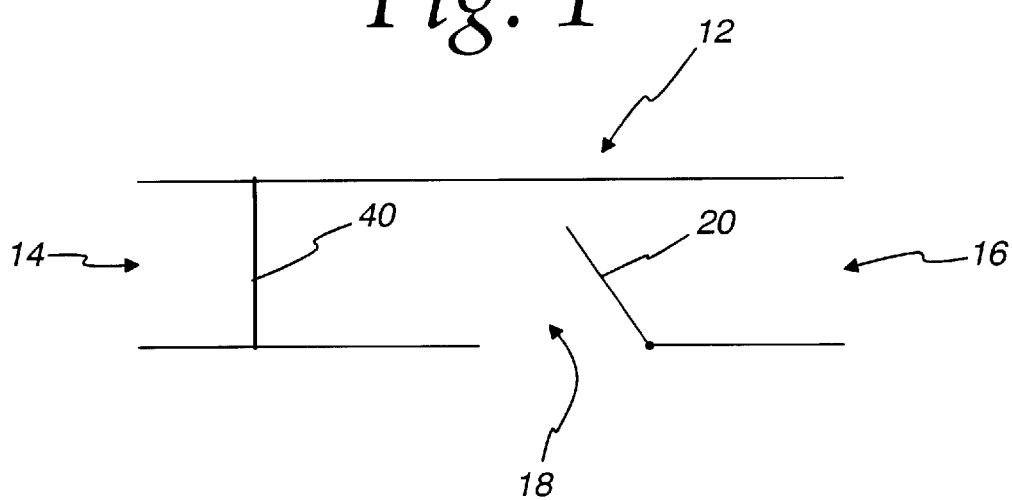
FIG. 1 is a schematic view of a livestock sorting system of the present invention.

Referring more particularly to FIG. 1, a livestock sorting system of the present invention is shown schematically. The preferred livestock sorting system of the present invention is the SURGER® ProSORT™ Gate, available from Babson Bros. Co. of Naperville, Ill. The livestock sorting system generally comprises an alley 12, having an entrance end 14, a main exit 16, and a sort exit 18. A sort gate 20 is positioned in the alley 12, and is shiftable between a sorting position in which the sort gate 20 blocks the main exit 16 and opens the sort exit 18, and a non-sorting position in which the sort gate 20 blocks the sort exit 18 and opens the main exit 16.

Figure 2:
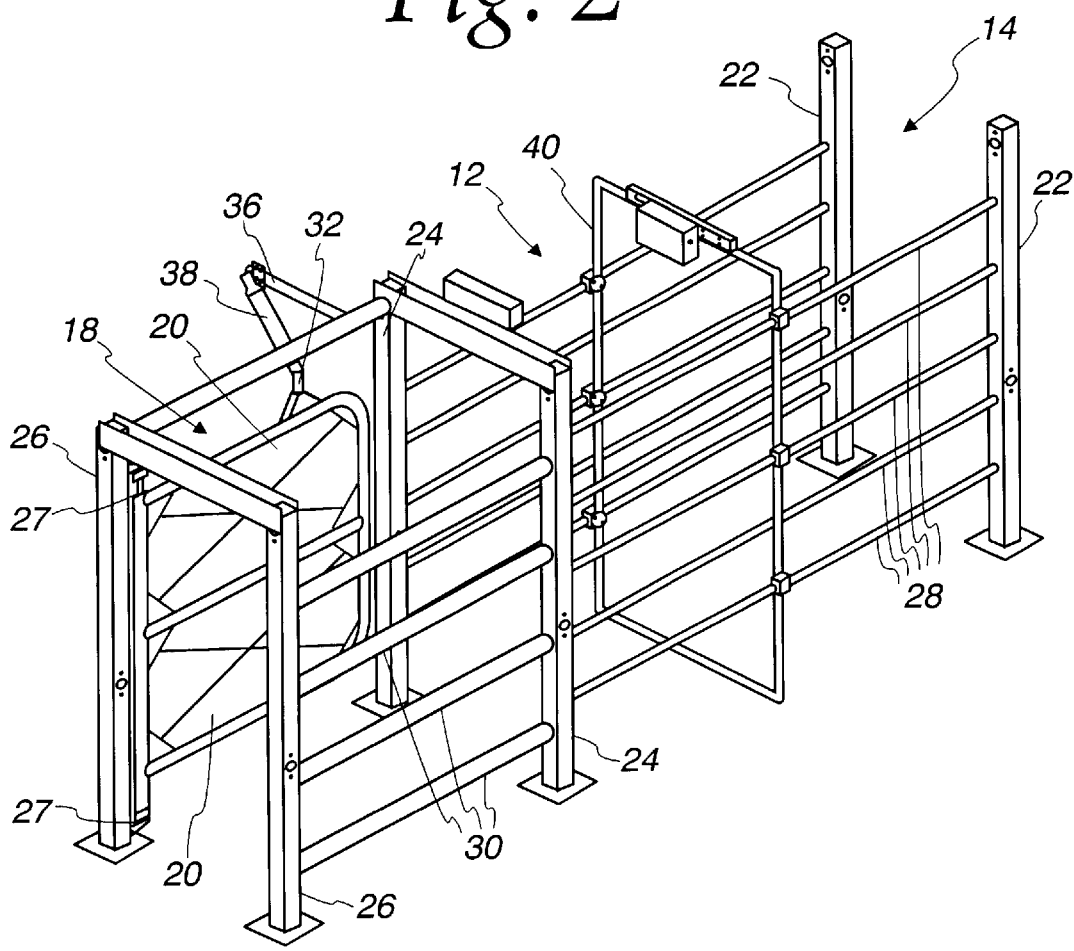
FIG. 2 is a top plan view of the sorting system of the present invention, not including the electrical control circuit.

Referring more particularly to FIG. 2, the alley 12 is formed by a plurality of post pairs 22, 24, and 26, each member of a pair being positioned on opposite sides of the alley from each other, and by a plurality of vertically-spaced, longitudinally extending rails 28 and 30. Rails 28 should be non-metallic, and are preferably fiberglass, so as not to interfere with an entrance sensor 40. As stated above, a sort gate 20 is positioned in the alley 12. Sort gate 20 is mounted to one of post pair 26 by hinges 27. Vertical pipe 32 extends vertically upward from the top rail of the sort gate 20 and is attached to gate actuator 36.

The gate actuator 36 moves the sort gate 20 from the non-sorting position (FIG. 2) to the sorting position (FIG. 1), and vice versa. As shown in FIG. 4, the gate actuator 36 comprises a double-acting fluid actuated cylinder 38 having ports 42 and 44 (FIG. 4) on each end. The gate actuator 36 is mounted on a cylinder support tube 45 that spans horizontally between posts 24 and 26. In other embodiments, the gate actuator 36 can comprise a linear slide, a ball screw, a servo drive, a gear drive, or other suitable devices. The use of a fluid-actuated cylinder is preferred, such as a 2.50 bore×16 inch stroke air cylinder available from Springville Mfg. Co. (Springville, N.Y.). The cylinder 38 can be equipped with adjustable exhaust valves, such as needle valves, at each port. Preferably, if needle valves are used, they should be set such that the gates open and close at the same rate, as quickly as possible. However, depending on cow flow, it may be desirable to adjust the needle valves such that the gate shifts to the non-sorting position more rapidly than it shifts to the sorting position, to "push" cows through the sort exit, and prevent fast moving non-sort cows from being erroneously sorted. Preferably, in place of needle valves, a filter regulator gauge in the air supply line is used for consistent gate action.

Further, the gate actuator 36 preferably also comprises a gate position sensor that determines whether the gate has fully opened or fully closed in response to a signal from the sort gate activator 90. The gate position is preferably determined indirectly using a pair of Hall Effect switches, which the position of a piston 47 in the air cylinder 38 that controls the gate (FIG. 6), but other position sensors can be used. Monitoring gate position enables the system to determine whether a cow or a person has been pinned by the gate 20, and react to that situation by reopening or reclosing the gate 20, as necessary.

Figure 6:
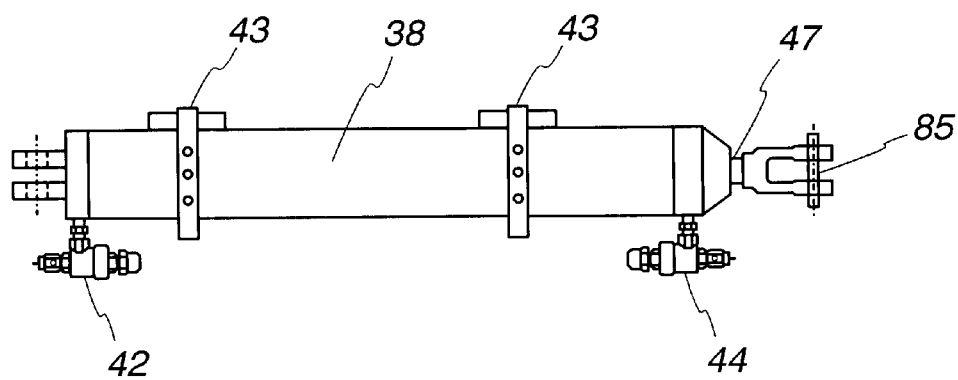
FIG. 6 is a schematic drawing of a cylinder and position sensor arrangement to determine gate position in accordance with the present invention.

Such a gate position sensor is a safety feature not known to be on any prior art sort gate. This safety feature prevents livestock and dairy personnel from being trapped if a gate closes prematurely. One embodiment of this safety feature is illustrated in FIG. 6, and includes a pair of Hall Effect sensors 43 (such as a series 8000, type 32 hall switch available from Springville Manufacturing of Springville N.Y.)that sense the position of the gate cylinder piston 47. The Hall Effect sensors 43 signal the activity-based controller 80 if the piston has not moved to a position coinciding with the gate being fully closed, indicating that a cow or other livestock may be trapped by the gate. Preferably, the gate reopens after three seconds when an animal is trapped. Although this period of time may be acceptable for a time when an animal is trapped, it may be unacceptable if a person is trapped. This situation can be addressed by using variable reopen signals based on the amount the gate has closed before stopping, as indicated by piston position. For example, livestock caught in a sort gate will hold the gate open at a position that is fairly widely spaced from the latch post 24, while a person is going to be trapped when the gate is closer to the latch post 24. Therefore, there are preferably two gate reopen signals that can be generated. One gate reopen signal includes a slight lag time, three seconds for example, and corresponds to a gate position that indicates a cow has been trapped. The other gate reopen signal includes little or no lag time to reopen the gate, and corresponds to a gate position that indicates a person has been trapped. These various signals may be sent by sensors positioned at various positions on the cylinder 38, which may require a third sensor (not illustrated) that indicates when the piston 47 is in an intermediate position corresponding to a gate spacing for a trapped person.

Thus in this example, when the piston has been detected at a point fairly distant from the gate close position for greater than a predetermined period of time, the sensor 43 signals the activity-based controller 80 which then reopens the gate to release a cow that has been trapped. When the piston has been sensed as stopping in a second and intermediate position for even an instant, the sensor 43 signals the activity-based controller 80 to reopen the gate immediately on the assumption that a person has been trapped in the gate. Other sensors and lag times are possible and are within the scope of the invention. For example, a second Hall Effect sensor could be positioned at or near the gate for detecting cow magnets (internal magnets) so that detection of a cow magnet prevents the gate from closing or reopens the gate when the cow magnet does not move for a predetermined period of time. Any other type of gate position detector can then be used to indicate when the gate is not closing properly or in a timely manner so that this second detector can signal the activity-based controller 80 to reopen the gate immediately on the assumption that a person or other non-livestock item has been trapped. Redundancy in any safety feature is desirable and, in the present example, a second set of sensors can be used in place of or in addition to the gate position sensors. For example, pressure sensors 85 on the gate can signal the activity-based controller 80 that the pressure required to close the gate has exceeded the maximum predetermined gate closing pressure to reopen the sort gate. The maximum pressure to be exceeded can be set at different settings corresponding to the position of the gate so that a greater pressure can be used in a cow-pinching position, but a reduced maximum pressure can be used at a person-pinching position. These pressure sensors can be mounted on the cylinder piston 47. Also, the gate position sensor safety feature can be used to indicate when an animal or person has been trapped as the gate is opening. When this feature is used, the activity-based controller 80 recloses the gate to free the trapped party. In either event, this aspect of the present invention provides a safety feature in the event the sort gate fails to complete a travel command whether the travel command be an open or close command. Further, this same safety feature can be used in other gate applications, including stall controls, crowd gate controls, etc.

Pressurized air is provided to ports 42 and 44 of air cylinder 38 via a source of pressurized air. A solenoid 35, such as one of the "45 Series" available from MAC Valves, Inc., of Wixom, Mich. is used to provide the pressurized air to one of ports 42 and 44 of cylinder 38. When air is provided to one port, the gate actuator 36 moves the gate 20 from the non-sorting position to the sorting position. When air is provided to the other port by the solenoid 35, the gate actuator 36 moves the gate to the non-sorting position from the sorting position.

The entrance sensor 40 is provided in the alley 12 for identifying individual livestock entering the alley and providing a signal to an activity-based controller 80 (FIG. 3) indicative of each specific animal. The activity-based controller 80 may be mounted near the gate or at a remote location and may be a personal computer, a programmable logic controller, a "soft" programmable logic controller, or any programmable device capable of processing unique and ever-changing identification signatures. The entrance sensor 40 can signal the activity-based controller 80 using any suitable means and may identify cows using a variety of signaling means such as infrared, magnetic fields, digital signals, optical signals, and ultrasound. The activity-based controller 80 also preferably comprises an operator interface, such a key pads, or keyboards, which enable the operator to enter information comprising identification of livestock to be sorted.

Preferably, the activity-based controller 80 is a programmable logic controller that responds to a sort instruction from another dairy system controller (not illustrated) or an operator interface that identifies specific livestock to be sorted, and, may in addition identify a particular type of sorting, such as sorting for hoof maintenance, or for medical reasons, etc. In this manner, the system is capable of further sorting the "sort" livestock based on the specific reason why each animal is being sorted. Thus, the activity-based controller 80 must have the ability to respond to different and variable instructions for each animal in a herd because a particular animal may be sorted only occasionally and for different reasons. As a result, the activity-based controller 80 must react to new sort parameters that are generated automatically by other controllers in the farm or by manually inputting sort parameters at the operator interface.

The entrance sensor 40 is preferably an antenna, which is mounted to one of the rails 28 or to the ceiling. However, the sensor can be a camera, an infrared detector, a Hall Effect sensor, or any other device capable of detecting a unique identification signature. The entrance sensor 40 is preferably mounted to the rail 28 that is farthest from the ground so that the entrance sensor 40 can be kept as clean as possible. The entrance sensor 40 is preferably located less than the length of an animal to be sorted (about eight feet for a cow) from entrance 14, to allow ample time for sorting even fast moving livestock.

Preferably, entrance sensor 40 identifies individual livestock by means of an identification device attached to each animal. The identification device can be a transponder or responder such as a ReCon or InFORM responder (available from Babson Bros. Co.) that can be hung around the neck of the each animal, or can be attached at the ear. However, any suitable identification device on or in the animal can be used.

As shown in FIG. 4, an exit sensor 50 is used to determine when an animal that has been identified as a sort animal has entered the sort exit 18. While the exit sensor 50 can be any known device that detects animal movement, including those disclosed in U.S. Pat. Nos. 5,183,008 and 5,628,284, the disclosures of which are herein incorporated by reference, the exit sensor 50 of the present invention is preferably an optic sensor. More preferably, the exit sensor 50 includes an electric eye 52 mounted on the post 24 bracing the sort gate 20, at a distance from the ground of approximately one-half the height of the sort gate 20, and a reflector 54 mounted to the post 26 to which the sort gate is hinged, at a height approximately equal to that of the sort gate 20.

The reflector 54 receives the beam from the electric eye 52, and reflects the beam back to the electric eye 52. When an animal enters the sort exit 14, the beam from the electric eye 52 is prevented from reaching the reflector 54, and thus is not "bounced back" to the electric eye 52. When the electric eye 52 does not receive the reflected beam for a predetermined period of time sufficient to determine that an animal is entering the sort exit, it provides an exit signal. This predetermined period of time can be adjusted depending on the type of exit sensor 50 being used.

To ensure that a sort cow triggers the exit sensor 50, a crossed pair of photo switches 53 and reflectors 55 can be arranged as illustrated in FIG. 4A to create an x-shaped "light curtain." With such an arrangement, both light beams will be broken when a cow passes through the gate, which may be desirable to avoid a false reading if only on light beam is broken. On the other hand, it may be desirable to require that only one beam to be broken to indicate that a cow has passed.

As stated above and shown more particularly in FIG. 3, the entrance sensor 40 is coupled to, preferably by an electric connection, the activity-based controller 80. The activity-based controller 80, which interprets and reacts to the unique identification signatures and/or sensors, is preferably in contact with a sort gate activator 90. The sort gate activator 90 can be, but need not be programmable, and includes a personal computer, a programmable logic controller, a microprocessor based controller, a printed circuit board, and other single board data processors. Preferably, the sort gate activator 90 is programmable to provide variable sort gate operation parameters that, for example, improve cow throughput functions such as multiple cow sort gate selection, gate speed, delay parameters, etc. The sort gate activator 90 can include an accumulator function or can optionally be connected to an accumulator device 94 such as an up/down counter. The sort gate activator 90 is coupled to the exit sensor 50 and the solenoid 35.

The electrical control circuit of the present invention also includes a manual input device 110, such as a keyboard, keypad, controller, button, or the like, connected to the sort gate activator 90 to allow the operator to manually shift the sort gate between positions, or to keep the sort gate in a certain position for a given number of animals.

While the system of the present invention preferably includes a separate activity-based controller 80 and sort gate activator 90, the functions of the sort gate activator can be performed by the activity-based controller 80. In this embodiment of the system of the present invention, the activity-based controller 80 (a) receives the unique identification signals corresponding to each animal from the entrance sensor, (b) compares that identification signal to a modifiable database of animals to be sorted, and (c) if the animal is a sort animal, sends a gate open signal to the solenoid 35. When the sort animal activates the exit sensor 50, the exit sensor 50 sends an exit signal to the activity-based controller 80, which in turn sends a gate close signal to the solenoid 35 only if a second cow to be sorted has not been identified by the entrance sensor 40.

Preferably, the activity-based controller 80 includes an accumulator function, which increments a counting value from a predetermined gate close value when an animal to be sorted passes by the entrance sensor 40 and is identified by the activity-based controller 80 as a "sort" animal, and subtracts the same counting value when an exit signal from the exit sensor 50 is received. The receipt of an exit signal by the activity-based controller 80 results in a gate close signal being sent only when the receipt of that signal causes the predetermined gate close value to be obtained. Instead of having an accumulator function within the activity-based controller 80, a separate accumulator device can be coupled to the activity-based controller 80.

The livestock sorting system of the present invention can also include secondary sort gates to further sort the "sort" animals. In this instance, each secondary sort gate (not illustrated) can be coupled to the single sort gate activator 90, or additional sort gate activators 90 can be used. Each secondary sort gate is similar to the primary sort gate described above and comprises a separate gate 20, gate actuator 36, and exit sensor 50. When an animal is identified by the entrance sensor 40, it sends a signal corresponding to that identification to the activity-based controller 80. The activity-based controller 80 then checks a modifiable database of animals to be sorted and determines if the animal is to be sorted, and if so, how it is to be sorted, i.e., once, twice etc. It then sends a signal to that effect to the gate activator 90, which, if the animal is to be also sorted by the second sort gate, opens the second sort gate at the same time the first gate closes. The system then operates as described previously.

In operation, as individual livestock, such as cows, enter the alley 12 through the entrance 14, each cow is identified by the entrance sensor 40, which transmits an identification signal to the activity-based controller 80. The activity-based controller 80 receives the identification signal indicative of the specific cow entering the alley 12, and compares that cow identification to a database of cows to be sorted. The database may include transponder numbers that correlate to cow numbers commonly used in a dairy which may require additional flexibility of the activity based controller 80 for programming cow identifications. The identification of the specific cows to be sorted can be entered by an operator directly into the activity-based controller 80, or can be entered into or by a remote controller 100 (FIG. 3) that is in contact with the activity-based controller 80. Remote controllers 100 can be located at various points in the dairy harvesting facility, such as the milking parlor or feeding stations, so that an operator or other dairy system controller can identify cows as sort cows based on observation, milk production, milking time, or other factors.

Further, the remote controller 100 can be programmed to provide identification of a specific cow as a sort cow based on predetermined parameters, such as food consumption, weight, milk production, days in milk, milking time, the date the cow was last examined by a veterinarian, pharmaceutical dosing schedule, etc. For example, a remote controller 100 located in the milking parlor, such as a MilkPointManager Automated Stall Control, available from Babson Bros. Co., can be programmed to identify any cow with milk production below a given level, or with a milking time longer than a given amount, as a sort cow, and provided a signal identifying that cow as a sort cow to the activity-based controller 80.

When the identification signal provided by the entrance sensor 40 matches input information from the database of a cow to be sorted, the activity-based controller 80 sends a sort signal to the sort gate activator 90. Upon receipt of the sort signal, the accumulator function increments by a predetermined counting value. Preferably, the counting value is the integer 1. If this causes the value of the accumulator function to be greater than a predetermined gate close value, which is preferably 0, the sort gate activator 90 provides a gate open signal to the solenoid 35, thus shifting the sort gate 20 to the sorting position.

As the sort cow enters the sort exit 18, it blocks the beam from electric eye 52 of exit sensor 50. Exit sensor 50 then sends an exit signal to sort gate activator 90, causing the accumulator function to decrement by the predetermined counting value. If this results in the gate close value being obtained, the sort gate activator 90 provides a gate close signal to the solenoid 35, thus shifting the sort gate 20 to the non-sorting position. If, however, a second cow has been identified as a sort cow by the activity-based controller 80 and a second sort signal has been received by the sort gate activator 90 before the exit signal form the first cow is received, the gate 20 will not close when the exit signal from the first cow is received.

In operation, this sorting procedure can be accomplished as follows: if the sort gate 20 is in the non-sorting position, the accumulator function value is 0, and the sort gate activator 90 is waiting for a sort signal from the activity based controller 80. When the first cow is identified as a sort cow and the sort gate activator 90 receives a sort signal from the activity-based controller 80, the accumulator function increments from 0 to 1, the sort gate activator issues a gate open signal causing the sort gate 20 to shift to the sorting position. When the second cow is identified as a sort cow and the accumulator function receives another sort signal before the first cow has caused an exit signal to issue, the accumulator function increments again, from 1 to 2. When the first cow then enters the sort exit 18, causing an exit signal to be received by the sort gate activator 90 from the exit sensor 50, the accumulator function is decremented from 2 to 1. Since the accumulator function is greater than 0, the gate close value, the gate 20 remains open; no gate close signal is sent by the sort gate activator 90. When the second cow enters the sort exit 18 (assuming the sort gate activator 90 has not received a sort signal for a third cow to be sorted), the exit sensor 50 provides an exit signal to the sort gate activator 90, causing the accumulator function to decrement from 1 to 0. Since 0 is the gate close value, the sort gate activator 90 issues a gate close signal to the solenoid 35, thus shifting the sort gate 20 to the non-sorting position.

If the gate operator desires to manually sort one or more cows, he can enter the number of cows to be manually sorted into the manual sorting device 110, which will in turn provide a sort signal to the sort gate activator 90 for the number of cows to be sorted. The manual sorting device 110 can be a controller for entry of the number of cows to be sorted or for entry of a gate close command, or can comprise a pair of buttons, with a sort signal being generated each time the sort button is pushed, and a gate close signal being generated if the gate close button is pushed. For example, if the operator wishes to sort the next four cows entering the sorting system, he can push the button on the manual sorting device 110 four times. This action will cause the accumulator function of the sort gate activator 90 to increment by four counting values. As a result, the gate 20 (if not already open) will open, and remain open, with no gate close signal being sent, until the fourth cow has entered the sort exit and caused an exit signal to issue from the exit sensor 50.

Figure 5:
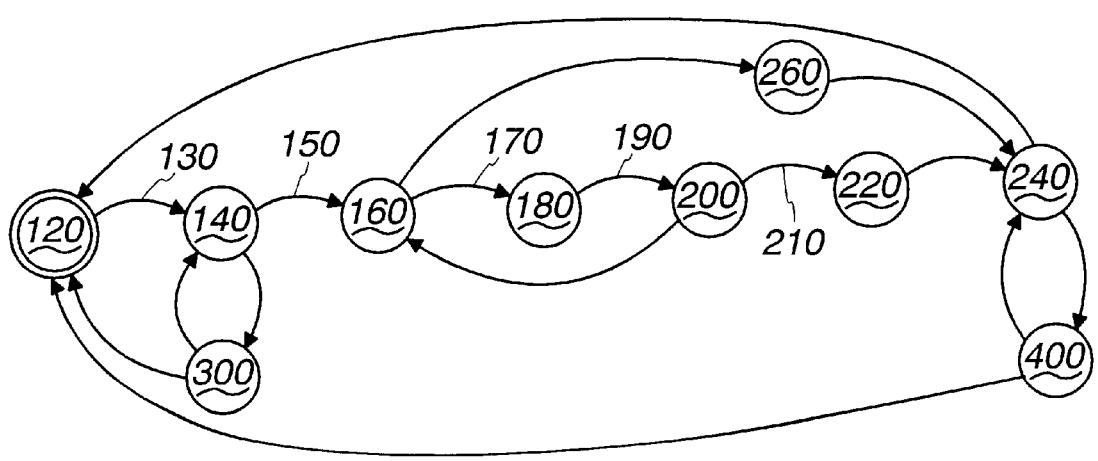
FIG. 5 is a state logic diagram of one embodiment of the sorting system of the present invention.

The preferred operation of the sorting system of the present invention is shown in FIG. 5. When the sort gate 20 is in the non-sorting position, the accumulator function value is zero, and the sort gate activator 90 is waiting for a sort signal from the activity-based controller 80. This corresponds to state 120. When the sort gate activator 90 receives a sort signal from the activity-based controller 80, the sort gate activator 90 issues a gate open signal 130, causing the gate 20 to shift to the sorting position, which is state 140. The sort gate activator then verifies that the gate 20 has fully opened, by receiving a signal 150 from a gate open sensor, such as a Hall effect switch located on the gate actuator 36. If no such signal is received, which indicates that a cow may be pinned by the gate, the gate activator 90 sends a gate close signal, followed shortly thereafter, for example, in two seconds, by a gate open signal, to return to state 140. If no signal from the Hall Effect switch is received after a predetermined number of gate reclosings and openings, the system returns to state 120. If the sort gate activator 90 receives a signal that the gate has opened (state 140), it then waits for the cow to be detected by the exit sensor 50, which is state 160.

When the cow is detected by the exit sensor 50 (state 170), the sort gate activator determines that the cow has been detected for a sufficient period of time to indicate that it is moving through the sort exit, which is state 180. This time period can be extremely short, on the order of 250 milliseconds. If the sort gate activator determines that the cow is moving through the sort exit (state 190), the activator then causes the accumulator function to decrement a counting value, and then checks the value of the accumulator function (state 200). If the accumulator function is zero, the gate close value, the sort gate activator 90 sends a gate close signal 210 to the gate actuator, causing the sort gate 20 to move to the non-sorting position, which is state 220. If, on the other hand, the accumulator function is greater than the gate close value, i.e., 1 or more, the system returns to state 160 to wait for a sort cow to be detected.

From state 220, the gate activator 90 checks to determine that gate 20 has fully closed (state 240), and that the cow is not pinned by the gate 20, by receipt of a gate closed signal from the Hall Effect switch on the gate actuator 36. The system then returns to state 120. If no such gate closed signal is received within a predetermined period of time, such as two seconds, the gate activator 90 sends a signal 400 reopening the gate for an extremely short period of time, and then reclosing the gate to return to state 220. If, after a predetermined number of gate reopenings and closing, no signal indicating that the gate 20 is closed is received by the gate activator 90, the system returns to state 120 and a signal can be sent to an operator to check or repair the gate position monitor.

Additionally, the system can be designed to have the gate activator 80 provide a gate close signal 260, resulting in gate close state 220 being obtained, if the cow is not detected by the exit sensor within a predetermined period of time, which can be adjusted as desired to prevent a reduction in throughput should a sort cow refuse to pass through a sort gate or is otherwise prevented from passing through a sort gate. Thus, overall throughput is optimized.

Although the livestock sorting system of the present invention has been described with reference to the preferred embodiment illustrated in the attached drawing figures, it is noted that substitutions may be made and equivalent s employed herein without departing from the scope of the invention as recited in the claims.

What is claimed is:

1. A livestock sorting system, comprising:
   (a) an alley comprising an entrance end and an exit end, the exit end comprising a main exit and sort exit;
   (b) a sort gate positioned in the alley between the main exit and the sort exit, the sort gate being shiftable between a sorting position in which the sort gate blocks the main exit and opens the sort exit, and a non-sorting position in which the sort gate blocks the sort exit and opens the main exit;
   (c) an entrance sensor for identifying livestock entering the alley and providing an identification signal;
   (d) an activity-based controller for receiving input comprising identification of individual livestock, where the activity-based controller receives the identification signal from the entrance sensor, and if the identification signal corresponds to a specific animal identified as a sort animal, provides a sort signal;
   (e) a sort gate activator for receiving the sort signal and providing a gate open signal in response to the sort signal, thereby causing the sort gate to shift to the sorting position, wherein the sort gate activator comprises a programmable logic controller; and
   (f) an exit sensor for identifying that an animal to be sorted has entered the sort exit, and providing an exit signal to the sort gate activator, the sort gate activator in turn providing a gate close signal in response to the exit signal, thereby causing the sort gate to shift to the non-sorting position only if at the time the sort gate activator receives the exit signal, the sort gate activator has not received a second sort signal from the activity-based controller, wherein the exit sensor is an optic sensor.

2. A livestock sorting system, comprising:
   (a) an alley comprising an entrance end and an exit end, the exit end comprising a main exit and sort exit;
   (b) a sort gate positioned in the alley between the main exit and the sort exit, the sort gate being shiftable between a sorting position in which the sort gate blocks the main exit and opens the sort exit, and a non-sorting position in which the sort gate blocks the sort exit and opens the main exit;
   (c) an entrance sensor for identifying livestock entering the alley and providing an identification signal;
   (d) an activity-based controller for receiving input comprising identification of individual livestock, where the activity-based controller receives the identification signal from the entrance sensor, and if the identification signal corresponds to a specific animal identified as a sort animal, provides a sort signal;
   (e) a sort gate activator for receiving the sort signal and providing a gate open signal in response to the sort signal, thereby causing the sort gate to shift to the sorting position, wherein the sort gate activator comprises a programmable logic controller; and
   (f) an exit sensor for identifying that an animal to be sorted has entered the sort exit, and providing an exit signal to the sort gate activator, the sort gate activator in turn providing a gate close signal in response to the exit signal, thereby causing the sort gate to shift to the non-sorting position only if at the time the sort gate activator receives the exit signal, the sort gate activator has not received a second sort signal from the activity-based controller, wherein the exit sensor is a crossed pair of optic sensors.

3. A livestock sorting system, comprising:
   (a) an alley comprising an entrance end and an exit end, the exit end comprising a main exit and sort exit;
   (b) a sort gate positioned in the alley between the main exit and the sort exit, the sort gate being shiftable between a sorting position in which the sort gate blocks the main exit and opens the sort exit, and a non-sorting position in which the sort gate blocks the sort exit and opens the main exit;
   (c) an entrance sensor for identifying livestock entering the alley and providing an identification signal;
   (d) an activity-based controller for receiving input comprising identification of individual livestock, where the activity-based controller receives the identification signal from the entrance sensor, and if the identification signal corresponds to a specific animal identified as a sort animal, provides a sort signal;
   (e) a sort gate activator for receiving the sort signal and providing a gate open signal in response to the sort signal, thereby causing the sort gate to shift to the sorting position, wherein the sort gate activator comprises a programmable logic controller; and
   (f) an exit sensor for identifying that an animal to be sorted has entered the sort exit, and providing an exit signal to the sort gate activator, the sort gate activator in turn providing a gate close signal in response to the exit signal, thereby causing the sort gate to shift to the non-sorting position only if at the time the sort gate activator receives the exit signal, the sort gate activator has not received a second sort signal from the activity-based controller.

4. The system of claim 3, wherein the entrance sensor is an antenna.

5. A livestock sorting system, comprising:
(a) an alley comprising an entrance end and an exit end, the exit end comprising a main exit and sort exit;
(b) a sort gate positioned in the alley between the main exit and the sort exit, the sort gate being shiftable between a sorting position in which the sort gate blocks the main exit and opens the sort exit, and a non-sorting position in which the sort gate blocks the sort exit and opens the main exit;
(c) an entrance sensor for identifying livestock entering the alley and providing an identification signal;
(d) an activity-based controller for receiving input comprising identification of individual livestock, where the activity-based controller receives the identification signal from the entrance sensor, and if the identification signal corresponds to a specific animal identified as a sort animal, provides a sort signal;
(e) a sort gate activator for receiving the sort signal and providing a gate open signal in response to the sort signal, thereby causing the sort gate to shift to the sorting position, wherein the sort gate activator comprises a programmable logic controller wherein the sort gate activator comprises a printed circuit board; and
(f) an exit sensor for identifying that an animal to be sorted has entered the sort exit, and providing an exit signal to the sort gate activator, the sort gate activator in turn providing a gate close signal in response to the exit signal, thereby causing the sort gate to shift to the non-sorting position only if at the time the sort gate activator receives the exit signal, the sort gate activator has not received a second sort signal from the activity-based controller.

6. A livestock sorting system, comprising:
(a) an alley comprising an entrance end and an exit end, the exit end comprising a main exit and sort exit;
(b) a sort gate positioned in the alley between the main exit and the sort exit, the sort gate being shiftable between a sorting position in which the sort gate blocks the main exit and opens the sort exit, and a non-sorting position in which the sort gate blocks the sort exit and opens the main exit;
(c) an entrance sensor for identifying livestock entering the alley and providing an identification signal;
(d) an activity-based controller for receiving input comprising identification of individual livestock, where the activity-based controller receives the identification signal from the entrance sensor, and if the identification signal corresponds to a specific animal identified as a sort animal, provides a sort signal;
(e) a sort gate activator for receiving the sort signal and providing a gate open signal in response to the sort signal, thereby causing the sort gate to shift to the sorting position, wherein the sort gate activator comprises a programmable logic controller electrically coupled to an accumulator for storing sort signals; and
(f) an exit sensor for identifying that an animal to be sorted has entered the sort exit, and providing an exit signal to the sort gate activator, the sort gate activator in turn providing a gate close signal in response to the exit signal, thereby causing the sort gate to shift to the non-sorting position only if at the time the sort gate activator receives the exit signal, the sort gate activator has not received a second sort signal from the activity-based controller.

7. The system of claim 6, wherein the accumulator increments a predetermined counting value upon receipt of a sort signal by the programmable logic controller, and decrements the predetermined counting value upon receipt of an exit signal by the programmable logic controller.

8. The system of claim 6, wherein the programmable logic controller provides the gate close signal upon receipt of an exit signal only if the receipt of the exit signal causes the accumulator to obtain a predetermined gate close value when the predetermined counting value is decremented.

9. The system of claim 6, wherein the accumulator increments a predetermined counting value upon receipt of a sort signal by the programmable logic controller from a manual override device.

10. The system of claim 3, further comprising a manual override device in contact with the sort gate activator.

11. The system of claim 3, wherein the system can be adjusted in a manner such that the sort gate shifts from the sorting position to the non-sorting position at a first rate of speed desired by the operator and from the non-sorting position to the sorting position at a second rate of speed desired by the operator.

12. The system of claim wherein the first rate of speed is less than the second rate of speed.

13. A livestock sorting system, comprising:
(a) an alley comprising an entrance end and an exit end, the exit end comprising a main exit and sort exit;
(b) a sort gate positioned in the alley between the main exit and the sort exit, the sort gate being shiftable between a sorting position in which the sort gate blocks the main exit and opens the sort exit, and a non-sorting position in which the sort gate blocks the sort exit and opens the main exit;
(c) an entrance sensor for identifying livestock entering the alley and providing an identification signal;
(d) an activity-based controller for receiving input comprising identification of individual livestock, where the activity-based controller receives the identification signal from the entrance sensor, and if the identification signal corresponds to a specific animal identified as a sort animal, provides a sort signal;
(e) a sort gate activator for receiving the sort signal and providing a gate open signal in response to the sort signal, thereby causing the sort gate to shift to the sorting position;
(f) an exit sensor for identifying that an animal to be sorted has entered the sort exit, and providing an exit signal to the sort gate activator, the sort gate activator in turn providing a gate close signal in response to the exit signal, thereby causing the sort gate to shift to the non-sorting position only if at the time the sort gate activator receives the exit signal, the sort gate activator has not received a second sort signal from the activity-based controller, wherein the system can be adjusted in a manner such that the sort gate shifts from the sorting position to the non-sorting position at a first rate of speed desired by the operator and from the non-sorting position to the sorting position at a second rate of speed desired by the operator, and wherein first rate of speed and the second rate of speed are substantially identical.

14. A livestock sorting system, comprising:
(a) an alley comprising an entrance end and an exit end, the exit end comprising a main exit and sort exit;
(b) a sort gate positioned in the alley between the main exit and the sort exit, the sort gate being shiftable between a sorting position in which the sort gate blocks the main exit and opens the sort exit, and a non-sorting position in which the sort gate blocks the sort exit and opens the main exit wherein the activity-based controller is coupled to a remote controller;

(c) an entrance sensor for identifying livestock entering the alley and providing an identification signal;

(d) an activity-based controller for receiving input comprising identification of individual livestock, where the activity-based controller receives the identification signal from the entrance sensor, and if the identification signal corresponds to a specific animal identified as a sort animal, provides a sort signal;

(e) a sort gate activator for receiving the sort signal and providing a gate open signal in response to the sort signal, thereby causing the sort gate to shift to the sorting position, wherein the sort gate activator comprises a programmable logic controller; and (f) an exit sensor for identifying that an animal to be sorted has entered the sort exit, and providing an exit signal to the sort gate activator, the sort gate activator in turn providing a gate close signal in response to the exit signal, thereby causing the sort gate to shift to the non-sorting position only if at the time the sort gate activator receives the exit signal, the sort gate activator has not received a second sort signal from the activity-based controller.

15. A livestock sorting system, comprising:

(a) an alley comprising an entrance end and an exit end, the exit end comprising a main exit and a sort exit;

(b) a sort gate positioned in the alley between the main exit and the sort exit, the sort gate being shiftable between a sorting position in which the sort gate blocks the main exit and opens the sort exit, the non-sorting position in which the sort gate blocks the sort exit and opens the main exit;

(c) an entrance sensor for identifying livestock entering the alley and providing an identification signal;

(d) an activity-based controller for receiving input comprising identification of individual livestock to be sorted, where the input controller receives the identification signal from the entrance sensor, and if the identification signal corresponds to a specific animal identified by the operator input, provides a gate open signal, thereby causing the sort gate to shift to the sorting position, wherein the activity-based controller comprises a programmable logic controller; and (e) an exit sensor for identifying that an animal to be sorted has entered the sort exit, and providing an exit signal to the activity-based controller, the activity-based controller providing a gate close signal in response to the exit signal, thereby causing the sort gate to shift to the non-sorting position only if at the time the activity-based controller receives the exit signal, the activity-based controller has not received an identification from the entrance sensor corresponding to an additional animal to be sorted, wherein the exit sensor is an optic sensor.

16. A livestock sorting system, comprising:

(a) an alley comprising an entrance end and an exit end, the exit end comprising a main exit and a sort exit;

(b) a sort gate positioned in the alley between the main exit and the sort exit, the sort gate being shiftable between a sorting position in which the sort gate blocks the main exit and opens the sort exit, the non-sorting position in which the sort gate blocks the sort exit and opens the main exit;

(c) an entrance sensor for identifying livestock entering the alley and providing an identification signal;

(d) an activity-based controller for receiving input comprising identification of individual livestock to be sorted, where the input controller receives the identification signal from the entrance sensor, and if the identification signal corresponds to a specific animal identified by the operator input, provides a gate open signal, thereby causing the sort gate to shift to the sorting position, wherein the activity-based controller comprises a programmable logic controller; and (e) an exit sensor for identifying that an animal to be sorted has entered the sort exit, and providing an exit signal to the activity-based controller, the activity-based controller providing a gate close signal in response to the exit signal, thereby causing the sort gate to shift to the non-sorting position only if at the time the activity-based controller receives the exit signal, the activity-based controller has not received an identification from the entrance sensor corresponding to an additional animal to be sorted, wherein the exit sensor is a crossed pair of optic sensors.

17. A livestock sorting system comprising:

(a) an alley comprising an entrance end and an exit end, the exit end comprising a main exit and a sort exit;

(b) a sort gate positioned in the alley between the main exit and the sort exit, the sort gate being shiftable between a sorting position in which the sort gate blocks the main exit and opens the sort exit, the non-sorting position in which the sort gate blocks the sort exit and opens the main exit;

(c) an entrance sensor for identifying livestock entering the alley and providing an identification signal;

(d) an activity-based controller for receiving input comprising identification of individual livestock to be sorted, where the input controller receives the identification signal from the entrance sensor, and if the identification signal corresponds to a specific animal identified by the operator input, provides a gate open signal, thereby causing the sort gate to shift to the sorting position, wherein the activity-based controller comprises a programmable logic controller; and (e) an exit sensor for identifying that an animal to be sorted has entered the sort exit, and providing an exit signal to the activity-based controller, the activity-based controller providing a gate close signal in response to the exit signal, thereby causing the sort gate to shift to the non-sorting position only if at the time the activity-based controller receives the exit signal, the activity-based controller has not received an identification from the entrance sensor corresponding to an additional animal to be sorted.

18. The system of claim 17, wherein the entrance is an antenna.

19. The system of claim 17, further comprising a manual override device in contact with the sort gate activator.

20. The system of claim 17, wherein the system can be adjusted in a manner such that the sort gate shifts from the sorting position to the non-sorting position at first rate of speed desired by the operator and from the non-sorting position to the sorting position at a second rate of speed desired by the operator.

21. The system of claim 20, wherein the first rate of speed is less than the second rate of speed.

22. A livestock sorting system, comprising:

(a) an alley comprising an entrance end and an exit end, the exit end comprising a main exit and sort exit;

(b) a sort gate positioned in the alley between the main exit and the sort exit, the sort gate being shiftable between a sorting position in which the sort gate blocks the main exit and opens the sort exit, and a non-sorting position in which the sort gate blocks the sort exit and opens the main exit;

(c) an entrance sensor for identifying livestock entering the alley and providing an identification signal;

(d) an activity-based controller for receiving input comprising identification of individual livestock, where the activity-based controller receives the identification signal from the entrance sensor, and if the identification signal corresponds to a specific animal identified as a sort animal, provides a sort signal;

(e) a sort gate activator for receiving the sort signal and providing a gate open signal in response to the sort signal, thereby causing the sort gate to shift to the sorting position;

(f) an exit sensor for identifying that an animal to be sorted has entered the sort exit, and providing an exit signal to the sort gate activator, the sort gate activator in turn providing a gate close signal in response to the exit signal, thereby causing the sort gate to shift to the non-sorting position only if at the time the sort gate activator receives the exit signal, the sort gate activator has not received a second sort signal from the activity-based controller, wherein the system can be adjusted in a manner such that the sort gate shifts from the sorting position to the non-sorting position at a first rate of speed desired by the operator and from the non-sorting position to the sorting position at a second rate of speed desired by the operator, and wherein first rate of speed and the second rate of speed are substantially identical.

23. A livestock sorting system, comprising:

(a) an alley comprising an entrance end and an exit end, the exit end comprising a main exit and a sort exit;

(b) a sort gate positioned in the alley between the main exit and the sort exit, the sort gate being shiftable between a sorting position in which the sort gate blocks the main exit and opens the sort exit, the non-sorting position in which the sort gate blocks the sort exit and opens the main exit;

(c) an entrance sensor for identifying livestock entering the alley and providing an identification signal;

(d) an activity-based controller for receiving input comprising identification of individual livestock to be sorted, where the input controller receives the identification signal from the entrance sensor, and if the identification signal corresponds to a specific animal identified by the operator input, provides a gate open signal, thereby causing the sort gate to shift to the sorting position, wherein the activity-based controller comprises a programmable logic controller, wherein the activity-based controller is coupled to a remote controller; and (e) an exit sensor for identifying that an animal to be sorted has entered the sort exit, and providing an exit signal to the activity-based controller, the activity-based controller providing a gate close signal in response to the exit signal, thereby causing the sort gate to shift to the non-sorting position only if at the time the activity-based controller receives the exit signal, the activity-based controller has not received an identification from the entrance sensor corresponding to an additional animal to be sorted.

24. A livestock sorting system, comprising:

(a) an alley comprising an entrance end and an exit end, the exit end comprising a main exit and sort exit;

(b) a sort gate positioned in the alley between the main exit and the sort exit, the sort gate being shiftable between a sorting position in which the sort gate blocks the main exit and opens the sort exit, and a non-sorting position in which the sort gate blocks the sort exit and opens the main exit;

(c) an entrance sensor for identifying livestock entering the alley and providing an identification signal;

(d) an activity-based controller for receiving input comprising identification of individual livestock, where the activity-based controller receives the identification signal from the entrance sensor, and if the identification signal corresponds to a specific animal identified as a sort animal, provides a sort signal;

(e) a sort gate activator for receiving the sort signal and providing a gate open signal in response to the sort signal, thereby causing the sort gate to shift to the sorting position;

(f) an exit sensor for identifying that an animal to be sorted has entered the sort exit, and providing an exit signal to the sort gate activator, the sort gate activator in turn providing a gate close signal in response to the exit signal thereby causing the sort gate to shift to the non-sorting position only if at the time the sort gate activator receives the exit signal, the sort gate activator has not received a second sort signal from the activity-based controller; and (g) a second sort gate coupled to the sort gate activator, the second sort gate being located at a point downstream from the sort gate and being shiftable between a sorting position and a non-sorting position.

25. A livestock sorting system, comprising:

(a) an alley comprising an entrance end and an exit end, the exit end comprising a main exit and sort exit;

(b) a sort gate positioned in the alley between the main exit and the sort exit, the sort gate being shiftable between a sorting position in which the sort gate blocks the main exit and opens the sort exit, and a non-sorting position in which the sort gate blocks the sort exit and opens the main exit;

(c) an entrance sensor for identifying livestock entering the alley and providing an identification signal;

(d) an activity-based controller for receiving input comprising identification of individual livestock where the activity-based controller receives the identification signal from the entrance sensor, and if the identification signal corresponds to a specific animal identified as a sort animal, provides a sort signal;

(e) a sort gate activator for receiving the sort signal and providing a gate open signal in response to the sort signal, thereby causing the sort gate to shift to the sorting position;

(f) an exit sensor for identifying that an animal to be sorted has entered the sort exit, and providing an exit signal to the sort gate activator, the sort gate activator in turn providing a gate close signal in response to the exit signal, thereby causing the sort gate to shift to the non-sorting position only if at the time the sort gate activator receives the exit signal, the sort gate activator has not received a second sort signal from the activity-based controller; and (g) a gate position sensor.

26. A livestock sorting system, comprising:

(a) an alley comprising an entrance end and an exit end, the exit end comprising a main exit and sort exit;

(b) a sort gate positioned in the alley between the main exit and the sort exit, the sort gate being shiftable between a sorting position in which the sort gate blocks the main exit and opens the sort exit, and a non-sorting position in which the sort gate blocks the sort exit and opens the main exit;

(c) an entrance sensor for identifying livestock entering the alley and providing an identification signal;

(d) an activity-based controller for receiving input comprising identification of individual livestock where the activity-based controller receives the identification signal from the entrance sensor, and if the identification signal corresponds to a specific animal identified as a sort animal, provides a sort signal;

(e) a sort gate activator for receiving the sort signal and providing a gate open signal in response to the sort signal, thereby causing the sort gate to shift to the sorting position;

(f) an exit sensor for identifying that an animal to be sorted has entered the sort exit, and providing an exit signal to the sort gate activator, the sort gate activator in turn providing a gate close signal in response to the exit signal, thereby causing the sort gate to shift to the non-sorting position only if at the time the sort gate activator receives the exit signal, the sort gate activator has not received a second sort signal from the activity-based controller; and (g) a gate position sensor for signaling the activity-based controller that the gate has not completed a travel command; and wherein the activity-based controller is programmed to reverse the travel command in response to a signal from the gate position sensor.

27. A livestock sorting system, comprising:

(a) an alley comprising an entrance end and an exit end, the exit end comprising a main exit and sort exit;

(b) a sort gate positioned in the alley between the main exit and the sort exit, the sort gate being shiftable between a sorting position in which the sort gate blocks the main exit and opens the sort exit, and a non-sorting position in which the sort gate blocks the sort exit and opens the main exit;

(c) an entrance sensor for identifying livestock entering the alley and providing an identification signal;

(d) an activity-based controller for receiving input comprising identification of individual livestock, where the activity-based controller receives the identification signal from the entrance sensor, and if the identification signal corresponds to a specific animal identified as a sort animal, provides a sort signal;

(e) a sort gate activator for receiving the sort signal and providing a gate open signal in response to the sort signal, thereby causing the sort gate to shift to the sorting position;

(f) an exit sensor for identifying that an animal to be sorted has entered the sort exit, and providing an exit signal to the sort gate activator, the sort gate activator in turn providing a gate close signal in response to the exit signal, thereby causing the sort gate to shift to the non-sorting position only if at the time the sort gate activator receives the exit signal, the sort gate activator has not received a second sort signal from the activity-based controller; and (g) a plurality of Hall Effect sensors in magnetic communication with a magnet on a gate-controlling air cylinder for signaling the activity-based controller that the gate has traveled to a certain position; and wherein the activity-based controller is programmed to reverse a travel command at a predetermined time corresponding to the position sensed by the Hall Effect sensors.

28. A livestock sorting system, comprising:

(a) an alley comprising an entrance end and an exit end, the exit end comprising a main exit and sort exit;

(b) a sort gate positioned in the alley between the main exit and the sort exit, the sort gate being shiftable between a sorting position in which the sort gate blocks the main exit and opens the sort exit, and a non-sorting position in which the sort gate blocks the sort exit and opens the main exit;

(c) an entrance sensor for identifying livestock entering the alley and providing an identification signal;

(d) an activity-based controller for receiving input comprising identification of individual livestock, where the activity-based controller receives the identification signal from the entrance sensor, and if the identification signal corresponds to a specific animal identified as a sort animal, provides a sort signal;

(e) a sort gate activator for receiving the sort signal and providing a gate open signal in response to the sort signal thereby causing the sort gate to shift to the sorting position;

(f) an exit sensor for identifying that an animal to be sorted has entered the sort exit, and providing an exit signal to the sort gate activator, the sort gate activator in turn providing a gate close signal in response to the exit signal, thereby causing the sort gate to shift to the non-sorting position only if at the time the sort gate activator receives the exit signal, the sort gate activator has not received a second sort signal from the activity-based controller; and (g) a plurality of Hall Effect sensors in magnetic communication with a magnet on a gate-controlling air cylinder for signaling the activity-based controller that the gate has traveled to a certain position; and pressure sensor for signaling the activity-based controller when a predetermined maximum pressure has been exceeded in attempting to cause the gate to travel to a certain position; and wherein the activity-based controller is programmed to reverse a travel command for the gate at a predetermined time corresponding to the position sensed by the Hall Effect sensors.

29. A livestock sorting system, comprising:

(a) an alley comprising an entrance end and an exit end, the exit end comprising a main exit and a sort exit;

(b) a sort gate positioned in the alley between the main exit and the sort exit, the sort gate being shiftable between a sorting position in which the sort gate blocks the main exit and opens the sort exit, the non-sorting position in which the sort gate blocks the sort exit and opens the main exit;

(c) an entrance sensor for identifying livestock entering the alley and providing an identification signal;

(d) an activity-based controller for receiving input comprising identification of individual livestock to be sorted, where the input controller receives the identification signal from the entrance sensor, and if the identification signal corresponds to a specific animal identified by the operator input, provides a gate open signal, thereby causing the sort gate to shift to the sorting position;

(e) an exit sensor for identifying that an animal to be sorted has entered the sort exit, and providing an exit signal to the activity-based controller, the activity-based controller providing a gate close signal in response to the exit signal, thereby causing the sort gate to shift to the non-sorting position only if at the time the activity-based controller receives the exit signal, the activity-based controller has not received an identification from the entrance sensor corresponding to an additional animal to be sorted; and (f) a second sort gate coupled to the sort gate activator, the second sort gate being located at a point downstream from the sort gate and being shiftable between a sorting position and a non-sorting position.

30. A livestock sorting system, comprising:

(a) an alley comprising an entrance end and an exit end, the exit end comprising a main exit and a sort exit;

(b) a sort gate positioned in the alley between the main exit and the sort exit, the sort gate being shiftable between a sorting position in which the sort gate blocks the main exit and opens the sort exit, the non-sorting position in which the sort gate blocks the sort exit and opens the main exit;

(c) an entrance sensor for identifying livestock entering the alley and providing an identification signal;

(d) an activity-based controller for receiving input comprising identification of individual livestock to be sorted, where the input controller receives the identification signal from the entrance sensor, and if the identification signal corresponds to a specific animal identified by the operator input, provides a gate open signal, thereby causing the sort gate to shift to the sorting position;

(e) an exit sensor for identifying that an animal to be sorted has entered the sort exit, and providing an exit signal to the activity-based controller, the activity-based controller providing a gate close signal in response to the exit signal, thereby causing the sort gate to shift to the non-sorting position only if at the time the activity-based controller receives the exit signal, the activity-based controller has not received an identification from the entrance sensor corresponding to an additional animal to be sorted; and (f) a gate position sensor.

31. A livestock sorting system, comprising:

(a) an alley comprising an entrance end and an exit end, the exit end comprising a main exit and a sort exit;

(b) a sort gate positioned in the alley between the main exit and the sort exit, the sort gate being shiftable between a sorting position in which the sort gate blocks the main exit and opens the sort exit, the non-sorting position in which the sort gate blocks the sort exit and opens the main exit;

(c) an entrance sensor for identifying livestock entering the alley and providing an identification signal;

(d) an activity-based controller for receiving input comprising identification of individual livestock to be sorted, where the input controller receives the identification signal from the entrance sensor, and if the identification signal corresponds to a specific animal identified by the operator input, provides a gate open signal, thereby causing the sort gate to shift to the sorting position;

(e) an exit sensor for identifying that an animal to be sorted has entered the sort exit, and providing an exit signal to the activity-based controller, the activity-based controller providing a gate close signal in response to the exit signal, thereby causing the sort gate to shift to the non-sorting position only if at the time the activity-based controller receives the exit signal, the activity-based controller has not received an identification from the entrance sensor corresponding to an additional animal to be sorted; and (f) a gate position sensor for signaling the activity-based controller that the gate has not completed a travel command, wherein the activity-based controller is programmed to reverse the travel command in response to a signal from the gate position sensor.

32. A livestock sorting system, comprising:

(a) an alley comprising an entrance end and an exit end, the exit end comprising a main exit and a sort exit;

(b) a sort gate positioned in the alley between the main exit and the sort exit, the sort gate being shiftable between a sorting position in which the sort gate blocks the main exit and opens the sort exit, the non-sorting position in which the sort gate blocks the sort exit and opens the main exit;

(c) an entrance sensor for identifying livestock entering the alley and providing an identification signal;

(d) an activity-based controller for receiving input comprising identification of individual livestock to be sorted, where the input controller receives the identification signal from the entrance sensor, and if the identification signal corresponds to a specific animal identified by the operator input, provides a gate open signal, thereby causing the sort gate to shift to the sorting position;

(e) an exit sensor for identifying that an animal to be sorted has entered the sort exit, and providing an exit signal to the activity-based controller, the activity-based controller providing a gate close signal in response to the exit signal, thereby causing the sort gate to shift to the non-sorting position only if at the time the activity-based controller receives the exit signal, the activity-based controller has not received an identification from the entrance sensor corresponding to an additional animal to be sorted; and (f) a plurality of Hall Effect sensors in magnetic communication with a magnet on a gate-controlling air cylinder for signaling the activity-based controller that the gate has traveled to a certain position, wherein the activity-based controller is programmed to reverse a travel command at a predetermined time corresponding to the position sensed by the Hall Effect sensors.

33. A livestock sorting system, comprising:

(a) an alley comprising an entrance end and an exit end, the exit end comprising a main exit and a sort exit;

(b) a sort gate positioned in the alley between the main exit and the sort exit, the sort gate being shiftable between a sorting position in which the sort gate blocks the main exit and opens the sort exit, the non-sorting position in which the sort gate blocks the sort exit and opens the main exit;

(c) an entrance sensor for identifying livestock entering the alley and providing an identification signal;

(d) an activity-based controller for receiving input comprising identification of individual livestock to be sorted, where the input controller receives the identification signal from the entrance sensor, and if the identification signal corresponds to a specific animal identified by the operator input, provides a gate open signal, thereby causing the sort gate to shift to the sorting position;

(e) an exit sensor for identifying that an animal to be sorted has entered the sort exit, and providing an exit signal to the activity-based controller, the activity-based controller providing a gate close signal in response to the exit signal, thereby causing the sort gate to shift to the non-sorting position only if at the time the activity-based controller receives the exit signal, the activity-based controller has not received an identification from the entrance sensor corresponding to an additional animal to be sorted;

(f) a plurality of Hall Effect sensors in magnetic communication with a magnet on a gate-controlling air cylinder for signaling the activity-based controller that the gate has traveled to a certain position; and (g) a pressure sensor for signaling the activity-based controller when a predetermined maximum pressure has been exceeded in attempting to cause the gate to travel to a certain position, wherein the activity-based controller is programmed to reverse a travel command for the gate at a predetermined time corresponding to the position sensed by the Hall Effect sensors.

* * * * *